United States Patent [19]

Härig

[11] Patent Number: 5,661,586

[45] Date of Patent: Aug. 26, 1997

[54] OPTICAL POSITIONING SYSTEM FOR AT LEAST ONE PICTURE ELEMENT

[75] Inventor: Thomas Härig, Eppstein, Germany

[73] Assignee: Linotype-Hell AG, Eschborn, Germany

[21] Appl. No.: 489,586

[22] Filed: Jun. 12, 1995

Related U.S. Application Data

[60] Continuation of Ser. No. 179,032, Jan. 6, 1994, abandoned, which is a division of Ser. No. 859,364, May 26, 1992, Pat. No. 5,387,995.

[30] Foreign Application Priority Data

Nov. 30, 1989 [DE] Germany ............... 39 39 551.0

[51] Int. Cl.$^6$ .................................................. G02B 26/08
[52] U.S. Cl. ............... 359/203; 359/211; 359/220
[58] Field of Search ....................... 359/209–211, 17, 359/18, 220, 831, 833, 834, 837, 203–205, 197, 221, 201, 615, 726; 250/234–236; 372/15–16, 19, 20, 32

[56] References Cited

U.S. PATENT DOCUMENTS 4,681,394  7/1987  Noguchi ........................ 359/213

FOREIGN PATENT DOCUMENTS

| 0 139 850 | 5/1985 | European Pat. Off. ........ G02B 27/12 |
| 0 277 883 | 8/1988 | European Pat. Off. ........ H01S 3/101 |
| 24 43 379 | 3/1976 | Germany ..................... G02B 27/17 |
| 2-226111  | 9/1990 | Japan ........................ G02B 26/10 |
| 0394446   | 6/1933 | United Kingdom ................ 359/221 |

OTHER PUBLICATIONS

Patent Abstracts of Japan, vol. 10, No. 86, Apr. 4, 1986, p. 443—Hideto Iwaoka "Optical Scanner".

IBM Technical Disclosure Bulletin, vol. 30, No. 7, Dec. 1987, "Dual Laser Reflective Scanner".

Primary Examiner—James Phan
Attorney, Agent, or Firm—Hill, Steadman & Simpson

[57] ABSTRACT

In an optical positioning system for at least two picture elements, a wavelength-dispersive, first light-deflecting element is used which deflects light beams in a first deflection direction according to their wavelength. In order to enhance the positioning speed, the optical system comprises a narrow-band light source with a controllable wavelength for every picture element. The first light-deflecting element is arranged in the beam path of a second light-deflecting element with which an additional, essentially wavelength-independent deflection can be implemented. The range of deflection of the first light-deflecting element is thereby noticeably smaller than that of the second light-deflecting element. The ray beams of the said light sources charge or impinge upon the wavelength-dispersive element in common. By setting the wavelength of its light source, each of the picture elements simultaneously receives a desired image position in the range of deflection of the second light-deflecting element around the basic position prescribed by it.

2 Claims, 2 Drawing Sheets

OPTICAL POSITIONING SYSTEM FOR AT LEAST ONE PICTURE ELEMENT

This is a continuation of application Ser. No. 08/179,032, filed Jan. 6, 1994, now abandoned, which is a division of application Ser. No. 07/859,364, filed May. 26, 1992, now U.S. Pat. No. 5,387,995.

BACKGROUND OF THE INVENTION

The invention is directed to an optical positioning system for at least two picture elements wherein at least two light sources emit light beams for generating the picture elements in an image plane.

Picture element positioning systems are known for a great variety of applications and in many embodiments. A significant group thereof serves for line-by-line scanning of surfaces, either for acquiring or for writing information. The dominating feature is thereby a continuously rotating, mechanical light deflector element.

In order to enhance the precision of the mechanical deflection motion, the combination of a specific category of mechanical deflection systems with an additional deflection possibility via acousto-optical deflectors is known (German Published Application 24 43 379, U.S. Pat. No. 4,279,472). Scan systems such as oscillating mirrors or polygonal wheels wherein the deflection surface has only a small angle relative to the ray beam incident onto the deflector element are included in this category of mechanical deflection systems: only for such systems, namely, is the direction of a misdirection detected in the image plane or at an equivalent location transmitted onto the acousto-optical deflector lying in the pro-scan system independently of the deflection position.

This, however, is not the case for scan systems having, for example, mirror faces at 45° relative to the rotational axis or prism deflectors, both charged parallel to the rotational axis.

Further, systems are known that select light bundles that differ in wavelength and can use them simultaneously or sequentially for scanning, for example JP-A-222817, wherein an optical positioning system employs a wavelength-dispersive light-deflecting element that is impinged upon in common by light beams of light sources wherein light beams are deflected in a first deflection direction within a deflection range according to the wavelength for positioning the picture elements.

In a laser printer that also belongs to the prior art, the ray beam emanating from a tunable semiconductor laser is guided with a scan motion along a straight scan line across a light-sensitive recording material on the recording drum of the laser printer, being guided with a hologram module (European Published Application 0 277 883). A f0 lens is also inserted into the beam path between the hologram module and the scan plane in order to focus the ray beam in the scan plane. The hologram member is a transparent polygon on which a desired plurality of hologram gratings are arranged, these being charged by the laser ray beam. In a simplest case, a hologram lens can also be provided instead of the hologram module. The hologram module and the hologram lens represent light-deflecting, wavelength-dispersive elements, i.e. elements whose diffraction is critically dependent on the light wavelength. A non-mechanical deflection of the ray beam is thus achieved that can occur with extremely high speeds. Versions of this positioning system are also known wherein the hologram module is simultaneously charged with a plurality of ray beams that, for example, emanate from three controllable lasers. The angles of incidence of the three ray beams on the hologram module can thereby be either identical or differ from one another.

What is disadvantageous in all of these known embodiments comprising a tunable laser and a holographic module or, respectively, a deflection element is that only a rather limited number of picture element positions can be set with high precision, this being inadequate, particularly for producing typographically demanding type matter from picture elements (pixels). The obtainable plurality of picture element positions in an optical positioning system of the applicable type is fundamentally defined by the spectral tuning range of the light source and the required spectral breadth for an exactly reproducible wavelength. For example, given a spectral tuning range of laser diodes that amounts to approximately 10 nm and given a typical temperature-dependency of the wavelength of 0.1–0.3 nm/K., a plurality of at most 1,000 exact image positions can be achieved even given a temperature stabilization to 0.1 K., whereas many tens of thousands of positions must be typically resolved given scanners for the graphic industry.

The picture element positioning belonging to the prior art employing the assistance of acousto-optical deflectors without mechanical motion and only by varying an audio frequency that is generated in the acousto-optical deflector has the limitation that the deflector can only resolve a comparatively low number of image positions and can only realize small deflection angles.

Known opto-mechanical positioning systems wherein the light-deflecting element rotates, in particular, around a rotational axis can have large usable deflection angles given high positioning precision. In particular, polygonal mirrors having faces that are arranged at 45° relative to the rotational axis are advantageous since the 1:1 conversion of rotational angle into scan angle that can therewith be achieved allows a good positioning precision. Moreover, deflecting prisms having 90° deflection (as the afore-mentioned polygonal mirrors) are insensitive to disruptions of the ideal mirror position, for example due to bearing wobble or vibration. A rotating pentaprism having a following scan objective is remarkably insensitive to tilt.

There is a desire to increase the usable scan speed in many areas, particularly in the graphic industry, in the case of the described, opto-mechanical deflectors that move at least one ray beam over the image plane or surface to be scanned in the scan mode. This increase can be generally achieved in that scanning is undertaken not only with one picture element but with a plurality of picture elements that are preferably guided at a constant spacing relative to one another. In the preferred opto-mechanical scan systems that are constructed with a polygonal mirror having faces at 45° relative to the rotational axis or are constructed with at least one prism and that are charged with a ray beam lying in the rotational axis in the ideal case, it is not possible to expand a plurality of ray beams parallel to one another and, thus, necessarily lying partly outside the rotational axis, since a rotation of the deflecting element or deflector is expressed in rotation of the picture elements insofar as these do not lie in the optical axis or, the rotational axis. If a plurality of picture elements in a region of the scan line were arranged on a line at a right angle vis-a-vis the scan direction, then this line would incline toward the scan line in accord once with the respective rotational angle.

SUMMARY OF THE INVENTION

An object underlying the instant invention is to improve an optical positioning system of the type initially cited such that the scan speed is improved by factors given high resolution of a great plurality of image positions on the basis of simultaneous positioning of at least two picture elements.

According to the invention, an optical positioning system is provided having two light sources (and possibly one light source if its wavelength is switched) that emit light beams for generating picture elements in an image plane. A wavelength-dispersive, first light-deflecting element is impinged upon in common by the light beams of the light sources and with which the light beams can be deflected in a first deflection direction within a deflection range in an image plane according to the wavelength for positioning the picture elements. The light sources for generating the picture elements are narrow band. A second light-deflecting element is arranged in the beam path between the light sources and the image plane. Deflection of the second light-deflecting element is independent of the wavelengths of the light sources. The light beams are deflected with the second light-deflecting element onto a respective basic position produced only by the second light-deflecting element for positioning the picture elements in a second deflection direction within a second deflection range in the image plane. The deflection range of the first light-deflecting element is noticeably smaller than the deflection range of the second light-deflecting element. The positions of the individual picture elements within the deflection range of the second light-deflecting element can be set around the respective basic position by the respective wavelengths of the light sources and the dispersion of the first light-deflecting element. In another embodiment, the first and second deflectors can also be combined such that only a single rotating deflector is provided having a built-in wavelength dispersive element.

In accord once therewith, the positioning system for a simultaneous positioning of a plurality of picture elements comprises a corresponding, i.e. identical, plurality of light sources having different, adjustable wavelengths. The ray beams emanating from these light sources are deflected proceeding in a common plane with the second light-deflecting element which here, too, is wavelength-independent in a first approximation.

A positioning system constructed with a further optical element has the advantageous features that, for a simultaneous positioning of a plurality of picture elements, a corresponding plurality of light sources having different, adjustable wavelengths is provided. Ray beams emanating from the light sources are deflected proceeding in a common plane with the second beam-deflecting element and charge or impinge upon at least one additional optical element. At least the one wavelength-dispersive element is arranged in the output beam path of the additional optical element such that the ray beams of different wavelengths are separated from one another with this element, and preferably in a direction different from the second deflection direction.

The additional optical element is advantageously the typically involved objective for focusing the picture elements which, as a result thereof, need be implemented only once. An objective for common focusing of the picture elements serves as an additional optical element that is arranged following the second deflector and in whose meridional plane the ray beams essentially proceed by moving the second, wavelength-independent deflector. A common charging or impinging by all ray beams is advantageous precisely for such a scan objective that must be designed to be particularly involved for extra-axial utilization.

Apart from the deflection of the picture element by the second light-deflecting element that is wavelength-independent, the position of the picture element in the positioning system of the invention is defined by the relative arrangement of the light source vis-a-vis the wavelength-dispersive element as well as by the wavelength emitted by the light source. The obtainable positioning range is thereby limited by the part of the optical system between the picture element and the wavelength-dispersive element, by the dispersion of the element, as well as by the wavelength range over which the light source can be tuned. The above parameters can be selected use-dependent within broad limits.

Lamps that emit broad band or in multiple lines having following variable monochromators, lasers that can be tuned broad band such as dye lasers or solid state lasers having Cr or Ti doping, semiconductor lasers or gas lasers as well having multiple emission lines can be employed as suitable light sources having variable wavelength.

The previous description shall be explained as an example. Let the mechanical, second deflector be a rotating mirror deflector or prism deflector having a typical number of 15,000 resolvable points given a 20 µm point spacing or, respectively, 30,000 points given a 10 µm point spacing and a precision in the range of a few µm down to a few tenths of a µm. Let the wavelength of the light source vary by 10 nm for the first deflector and let the stepping size for reliably reproducible variation be 0.1 nm. 100 addressable positions then derive. Let the dispersion of the element provided be matched to the following optics such that the picture element shifts by 20 µm given a 10 nm wavelength variation. This corresponds to a spatial resolution of 0.2 µm per wavelength variancy of 0.1 nm. The resolution of the first deflection system here thus lies more than one order of magnitude higher than that of the second deflection system, but given a far more constricted scan range. In combination, however, the strengths of the two systems can be united.

In the further embodiment of examples, let the dispersive element be charged with an essentially parallel ray beam and let it be situated preceding a focusing optics.

When a grating having a grating period D is employed as a dispersive element, then $$D \sin w(\lambda) = \lambda, \quad \text{(Eq.1)}$$

derives for a wavelength $\lambda$ when the Bragg condition is set, whereby w is the angle to the grating normal and, thus, half the angle between the zero and first diffraction order of the grating under Bragg incidence.

Let D=0.2 mm apply and let the mean wavelength of the variable light source amount to $\lambda_o$=800 nm, then $w(\lambda_o)$= 0.2292° or, in other notation, equals 4 mrad results. In a good approximation $$\Delta w = \Delta \lambda w(\lambda_o)/\lambda_o = 0.005 \text{ mrad/m} \quad \text{(Eq.2)}$$

with $\Delta \lambda = \lambda - \lambda_o$ results for the neighboring wavelengths $\lambda$.

With a focal length f of the focusing optics that is employed and follows the grating of f=400 mm, a deflection in the image plane of $$\Delta y = f \tan (\Delta w), \quad \text{(Eq.3)}$$

thus $\Delta y$=2 µm per $\Delta \lambda$=1 nm, i.e. a deflection of 20 µm given a 10 nm wavelength variation.

When a boundary surface of a prism in air, which is non-perpendicularly penetrated, is employed as a dispersive element, then, given the assumption of BK7 as a material of the prism, a refractive index of approximately n=1.511 and a dispersion of $\Delta n/\Delta \lambda = 2 \times 10^{-5}$/nm derives at the central wavelength λ=780 nm. For $w_1$=14° relative to the exit face as a incident angle of the ray beam, given λ=780 nm, $w_a$ (780 nm)=arc sin(1.511 sin 14°)=21.441° derives for the exit angle guide angle $w_a$ according to the law of refraction $$n \sin(w_1) = \sin(w_a), \quad (Eq.4)$$

whereby the refractive index of air at 1 was already used.

$w_a$(770 nm)=arc sin (1.5112 sin 14°)=21.4440° derives for λ=770 nm. The angular difference transforms via the focusing optics of f=400 mm according to Equation 3 to a rounded-off Δy=20 μm in the image plane. The position shift recited in the upper example is thus likewise achieved given a 10 μm wavelength variation.

In order to enlarge the positioning range outside the second, i.e. the main deflection direction, a plurality of wavelength-dispersive elements can be successively connected in the beam path or one such element can be multiply traversed after additional, constant deflection of the beam path. The positioning of the picture element outside the second, main deflection direction due to wavelength control of the light source in combination with at least one wavelength-dispersive element is particularly suitable as an additive control element in an opto-mechanical scan system, particularly for small position changes given high precision of the positioning.

In a modification of the principle of the invention, it is possible to simultaneously unite a plurality of ray beams in the scanned surface or, respectively, image surface, to form one picture element on the basis of the wavelength-dispersive element, even when the ray beams proceed separately up to the wavelength-dispersive element. Additional mechanical means for rough adjustment can be provided for uniting the picture elements of various sources, a fine adjustment by selecting the suitable wavelengths of the light sources additionally belonging thereto. Applied examples are scanners that respectively scan a picture element with light sources of different spectral ranges or positioning devices that should unite a high energy in one point and therefore image a plurality of light sources in this point.

In the positioning system of the invention wherein, however, the picture elements of different sources should assume predetermined, separate positions both absolutely as well as relative to one another, the relative positioning can likewise be achieved by setting suitable wavelengths of the light sources. These relative positions can also be chronologically varied by controlling the light wavelengths without raising the demands made of the mechanical design and the stability of the positioning system by employing additional mechanical control elements.

As discussed, the second light-deflecting element that produces the main deflection in terms of operation can be a component part of an opto-mechanical deflector. This is especially advantageous when polygonal mirror faces are involved that are arranged at 45° relative to the rotational axis or when a prism, particularly a pentaprism, is involved wherein the reflection at some prism faces is utilized and that has a largely wobble-compensating effect together with a following objective.

For some applications, the wavelength-dispersive element is advantageously rigidly connected to the moved, particularly rotating part of the opto-mechanical deflector. The advantage is that the effective area of the wavelength-dispersive element can thus be kept small and need not cover the operational deflection angle and the incidence onto the dispersive element can be held constant better, independently of the rotational angle. A laser can advantageously be employed as a light source having a controllable wavelength.

In an optical positioning system for two picture elements that are simultaneously generated with a respective ray beam that emanates from a respective, spectrally narrow-band light source as well as with at least a total of one wavelength-dispersive element that the ray beams impact, the light source having a discrete wavelength is respectively combined with the wavelength-dispersive elements charged or impinged upon by the light beam that emanates from this light source such that the desired position of the picture element is established. The optical positioning system is thus directed to a fabrication stage in which suitable combinations of light sources having discrete, invariable wavelengths as well as wavelength-dispersive elements matched in embodiment and arrangement are selected for the respective system. In particular, light sources having discrete emission wavelengths, such as semiconductor laser diodes, that are conditioned or can be defined by the manufacturing process can be selected. For that purpose, for example, a suitable wavelength-dispersive element is selected from a plurality of similar wavelength-dispersive elements having slightly different dispersion, and is combined with a semiconductor laser diode or with a pair of the respective semiconductor laser diodes. Given more than two picture elements, a respectively further, separately charged dispersive element is to be provided beginning with the third source or, on the other hand, a respective source with variable wavelength is to be advantageously provided.

Generally, a planar grating structure can be advantageously employed as a wavelength-dispersive element. This includes the employment of an acousto-optically generated grating structure.

This can be particularly realized by at least one hologram.

However, the wavelength-dispersive element can also be conventionally composed of at least one optical element into which a ray beam penetrates outside of its optical axis. This can thereby be a lens whose prismatic effect or, chromatic aberration outside the principal axis is utilized. An additional wavelength-dispersive element in the optical positioning system can thus be eliminated.

The wavelength-dispersive element can comprise at least one essentially planar boundary surface between two media having different refractive indices that is oriented obliquely relative to the axis of an impinging ray beam. This includes the employment of a prism.

In detail, the afore-mentioned European Published Application 277 883 is referenced with respect to the various embodiments of wavelength-dispersive elements.

The invention shall be set forth below with reference to a drawing having four figures.

DESCRIPTION OF THE PREFERRED EMBODIMENTS

Figure 1:
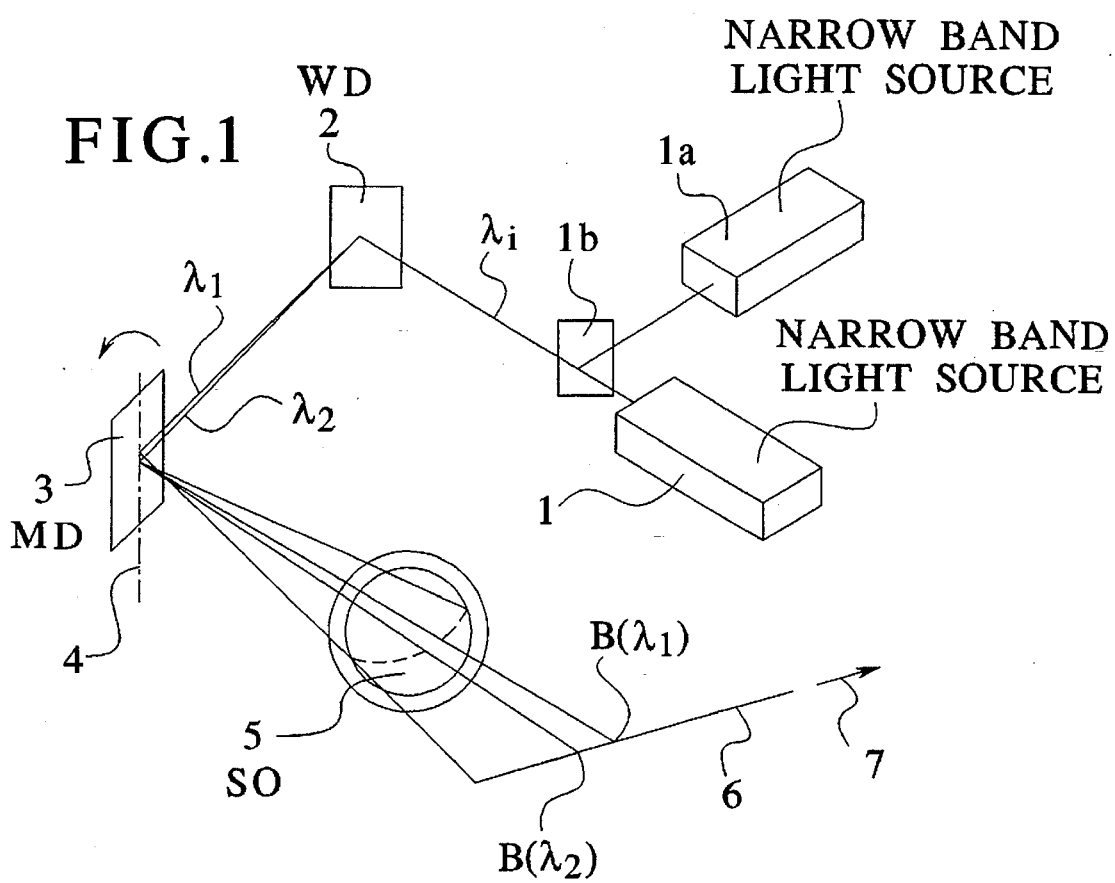
FIG. 1 is a schematic illustration of an optical positioning system comprising two light sources in which a beam path is doubly deflected.

FIG. 1 shows an optical positioning system having two narrow-band light sources 1, 1a with controllable wavelength. The ray beams emanating from them are united in a partially reflective mirror 1b. A wavelength-dispersive element 2, an optical-mechanical deflector 3 that can be rotated around a rotational axis 4, and a scan objective 5 are arranged in this beam path. The light emitted by the light sources is imaged through the scan objective 5 in picture elements along a scan line 6. The scan motion 7 in the scan line 6 is based on the rotation of the optical-mechanical deflector 3 and is also referred to as an operational or a second scan motion. The scan line 6 is scanned, on the one hand, at a light wavelength $\lambda_1$. For example, this light wavelength corresponds to a momentary picture element position $B(\lambda_1)$. Since a different wavelength is set at the light source 1a, on the other hand, an image position produced by the stationary wavelength-dispersive element 2 is present at $B(\lambda_2)$. FIG. 1 shows the specific instance wherein both picture elements $B(\lambda_1)$ and $B(\lambda_2)$ lie in the same scan line 6. In other embodiments, however, the first deflection motion that is produced by varying the wavelength of the light source 1 can generally occur in every direction vis-a-vis the second deflection motion.

Figure 2:
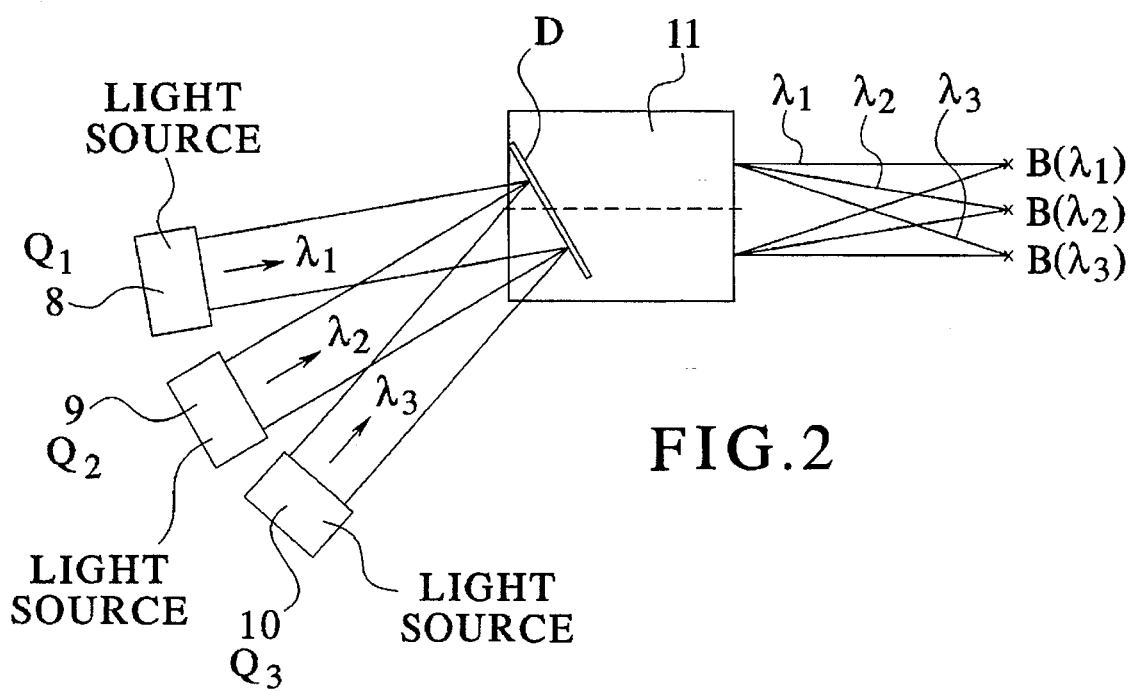
FIG. 2 schematically shows a part of an optical positioning system in which a plurality of ray beams are united in a picture element in a plan view or side view.

In the positioning system according to FIG. 2, three light sources that emit different wavelengths $\lambda_1$, $\lambda_2$ and $\lambda_3$ are referenced 8, 9 and 10. The ray beams that emanate from these light sources meet in a wavelength-dispersive element 11 by which they are positioned on a scan surface (not shown) at a distance from one another as picture elements $B(\lambda_1)$, $B(\lambda_2)$ and $B(\lambda_3)$. The relative position of the picture elements $B(\lambda_1)$, $B(\lambda_2)$, $B(\lambda_3)$ can be varied by setting the wavelength of the light sources 8 through 10. The three picture elements can be moved along the scan line in the illustrated position next to or, respectively, above one another with a mechanical deflector that is not shown for purposes of simplification.

Figure 3:
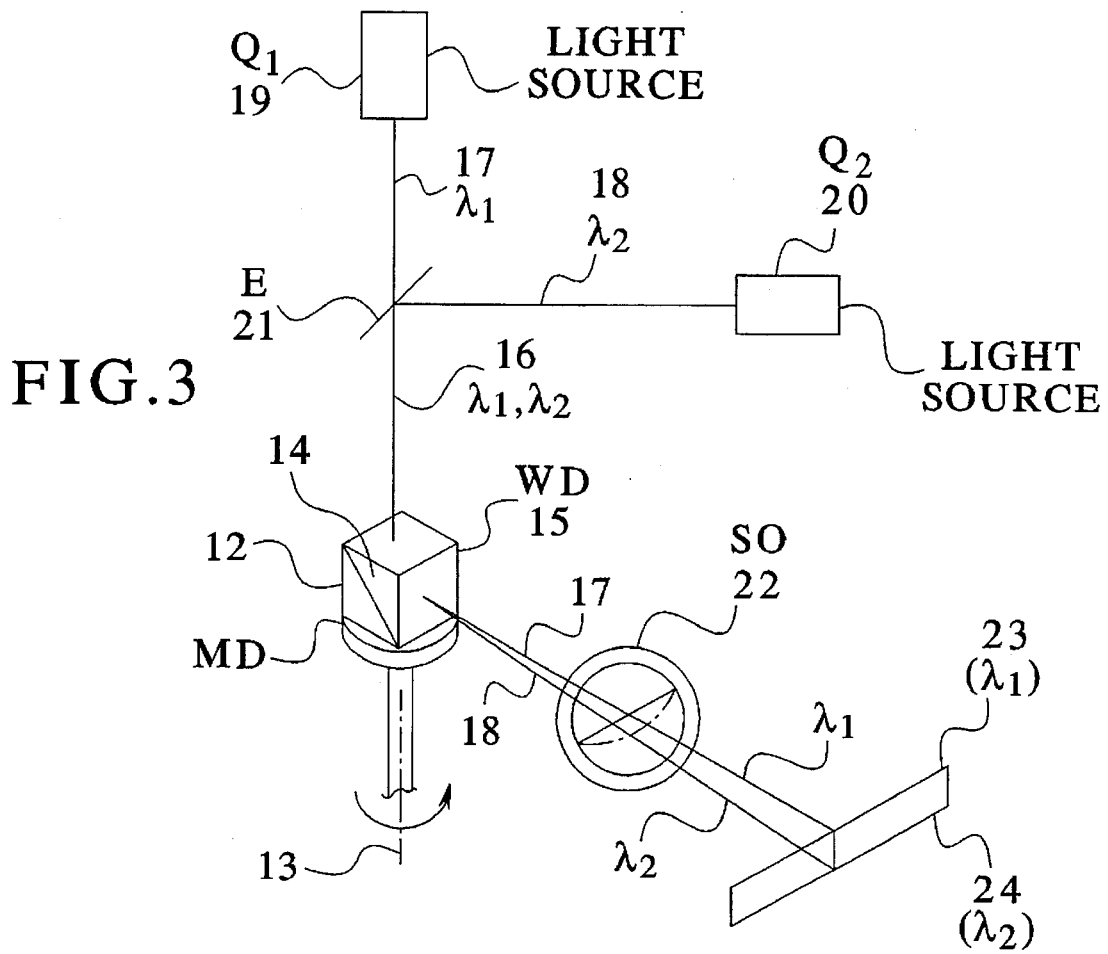
FIG. 3 is an optical positioning system comprising a mirrored deflector that is essentially charged or impinged upon by the ray beam in the rotational axis, shown in a schematic illustration.
Figure 4:
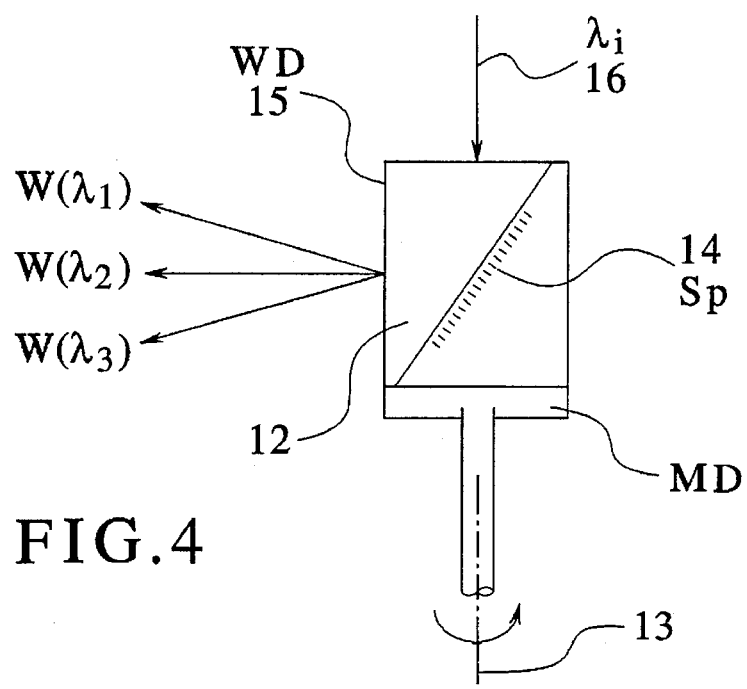
FIG. 4 illustrates the light-deflecting element shown enlarged in a side view.

An optical-mechanical deflector (deflector 12) is employed in the positioning system of FIG. 3, this being shown in detail in FIG. 4. The optical-mechanical deflector rotates around an ideal rotational axis 13 and is symbolized by a mirrored surface 14. A wavelength-dispersive element 15 is integrated in the optical-mechanical deflector so that it is co-rotated. A ray beam 16 impinges the wavelength-dispersive element 15 and at the mirrored surface 14 in the direction of the ideal rotational axis 13, whereby the ray beam 16 can be composed of two sub-ray beams 17 and 18 of the light sources 19 and 20, see FIG. 3. The sub-ray beams 17 and 18 having the wavelength $\lambda_1$ and $\lambda_2$ are united by a semi-reflecting optical element 21 to form the ray beam 16. A scan objective 22-see FIG. 3-is arranged in the output beam path of the wavelength-dispersive element 15 between the deflector and an image plane (not referenced), being arranged thereat such that the picture elements are positioned in the planar image plane. The scan lines 23 and 24 are placed perpendicularly to the scan rotation here by the wavelength-dispersive element 15 and are therefore deflected across the image plane shifted essentially parallel.

Multiple parallel traces can be realized with such a positioning system even given a provided, advantageous 90° deflection in the mechanical deflector.

FIG. 4 shows in detail how the exit angle $W(\lambda_1)$ and $W(\lambda_2)$ as well as $W(\lambda_3)$ depend on the light wavelengths $\lambda_1$, $\lambda_2$ and $\lambda_3$. Proceeding from a plurality of light sources, the light wavelengths can thereby simultaneously impinge in the ray beam 16 or, on the other hand, can be emitted in chronological succession by only one controlled light source.

The scan objective 22 is preferably passed in the meridional plane by the ray beam 18 having the wavelength $\lambda_2$ that is deflected by 90° by the mirrored surface 14. The ray beam having the wavelength $\lambda_1$ passes through the scan objective slightly outside the meridional plane.

Although various minor changes and modifications might be proposed by those skilled in the art, it will be understood that I wish to include within the claims of the patent warranted hereon all such changes and modifications as reasonably come within my contribution to the art.

I claim:

1. An optical positioning system, comprising:

a light source means for emitting a light beam for generating a picture element in an image plane, said light source means having a variable and controllable wavelength;

a rotatable wavelength-dispersive, light-deflecting means comprising a light-deflecting element having integrated therewith a wavelength dispersive element arranged to be impinged upon by the light beam incoming from the light source means along its rotational axis and for deflecting the incoming light beam by reflection with a mirrored surface in a basic deflection direction within a basic deflection range for setting a basic position of the picture element in the image plane based upon a rotational position of the light-deflecting means; and said light-deflecting means setting a position of the picture element about the basic position within the basic deflection range by its wavelength-dispersive property through setting and control of a wavelength of the light beam emanating from the light source means.

2. An optical positioning system according to claim 1 wherein a scan objective is positioned between the image plane and the light-deflecting means.

* * * * *